United States Patent [19]

Mano et al.

[11] Patent Number: 4,793,241
[45] Date of Patent: Dec. 27, 1988

[54] PISTON POSITION DETECTOR FOR FLUID PRESSURE CYLINDER

[75] Inventors: Shigeru Mano, Kakamigahara; Hiroshi Kagohashi, Kasugai, both of Japan

[73] Assignee: C K D Kabushiki Kaisha, Aichi, Japan

[21] Appl. No.: 117,464

[22] Filed: Nov. 4, 1987

[30] Foreign Application Priority Data

Nov. 13, 1986 [JP] Japan ................................ 61-27038

[51] Int. Cl.$^4$ .......................... F01B 25/26; F01B 31/12
[52] U.S. Cl. ............................................ 92/5 R; 91/1; 91/DIG. 4; 324/207; 324/208; 246/249
[58] Field of Search .............. 324/207, 208, 213, 219, 324/225, 246; 246/249; 92/5; 91/1, DIG. 4

[56] References Cited

U.S. PATENT DOCUMENTS 4,403,515  9/1983  Iwasaki .......................... 324/207
4,618,823  10/1986  Dahlheimer et al. .............. 324/207

FOREIGN PATENT DOCUMENTS 46480  11/1972  Japan.
129106  9/1983  Japan.

Primary Examiner—Robert E. Garrett
Assistant Examiner—Thomas Denion
Attorney, Agent, or Firm—Emmanuel J. Lobato; Robert E. Burns

[57] ABSTRACT

In a piston position detector for a fluid pressure cylinder operating by fluid pressure such as air pressure or oil pressure, a permanent magnet is mounted on a piston sliding in a non-magnetic cylinder, and a magnetic detection element to respond to the magnetic field formed by the permenent magnet and to generate detection signals is mounted to any position of the cylinder. A magnetic induction piece in sheet form is interposed between the cylinder and the magnetic detection element, so that when the permanent magnet faces the front of the magnetic detection element, the magnetic induction piece is magnetically saturated by performing bypass induction of only a part of the magnetic flux of the permanent magnet to act on the magnetic detection element and most of the magnetic flux acts on the magnetic detection element. As the permanent magnet is shifted from the front of the magnetic detection element, the ratio of the magnetic flux subjected to the bypass induction through the magnetic induction piece is increased and the magnetic flux density acting on the magnetic detection element is rapidly decreased, thereby the piston position can be detected with precise accuracy.

2 Claims, 3 Drawing Sheets

PISTON POSITION DETECTOR FOR FLUID PRESSURE CYLINDER

BACKGROUND OF THE INVENTION

1. Field of the Invention

The present invention relates to a piston position detector for a fluid pressure cylinder acting by air pressure or oil pressure, wherein the position of a piston sliding within a cylinder is detected from the outside of the cylinder, and the piston is stopped by the detection signal and the operating signal is transmitted to the other actuator, and more particularly to a position detector wherein the cylinder is made of a non-magnetic material such as aluminium, and the position of the piston is detected based on the variation of the magnetic field formed by a permanent magnet mounted on the piston.

2. Description of the Prior Art

Such a piston position detector in the prior art is disclosed in the Japanese Patent Publication No. 47-46840 where a reed switch responding to only magnetic flux in the moving direction of piston is used as the detection element, and in the Japanese Utility Model Unexamind Publication No. 58-129106 where a plurality of magnetoresistive elements are assembled in a bridge and used as a detection element in order respond to the strength of an acting magnetic flux irrespective of its direction. Usually, a permanent magnet mounted on a piston is ring shaped and fitted to the outer circumfrence of the piston in a concentric relation, thereby the magnetic field formed by the permanent magnet becomes as shown in broken lines of FIG. 4(1). In this case, the X-axis is one passing through the center of the cross-section of the permanent magnet a in parallel to the axial center of the cylinder, that is, the moving axis of the permanent magnet a. Strength of the magnetic field on line b apart from the X-axis by distance y, irrespective of direction of the magnetic flux, is proportional to the total of the magnetic flux in all directions. As shown in broken lines of FIG. 4(2), the magnetic field strength on line b in FIG. 4(1), irrespective of direction, becomes strongest at the position corresponding to the center of the permanent magnet a and becomes weaker gradually at positions away from the center position towards both sides, thus distribution becomes mountain-like shaped. On the contrary, the magnetic field strength on line b in the direction of the line b becomes strongest at the position corresponding to the center of the permanent magnet a, and since the magnetic flux is orthogonal to the line b, at positions away from the center position towards both sides by distance x, the magnetic field strength on line b in the direction of the line b becomes zero once at the positions. At positions further away from the center, since the direction of the magnetic flux gradually becomes oblique, the component in the direction of the line b increases again so as to form a small mountain, and then the magnetic field strength in the direction of the line b decreases again with decrease of the flux density. Thus the magnetic field strength in the direction of the line b has such a distribution that the lower peaks are formed on both sides of the higher peak at the center.

Consequently, when the magnetic detection element responding to the strength of the magnetic flux, irrespective of its direction, is arranged on line b, since the magnetic detection element acts in a wide range of the stroke of the piston, detection of great accuracy cannot be effected. also when the magnetic detection element such as a reed switch responding only to magnetic flux in the moving direction of the piston is used, depending on the sensitivity setting, the detection signals are generated not only on the position corresponding to the center of the permanent magnet but also on positions slightly away from the center portion towards both sides, resulting in an erroneous operation.

SUMMARY OF THE INVENTION

An object of the invention is to eliminate the above-mentioned disadvantages in the prior art and to provide a position derector which will detect the position of a piston with precise accuracy.

In order to attain the foregoing object, a magnetic induction piece in sheet form is interposed between the cylinder and the magnetic detection element, and the magnetic induction piece has a plane area substantially larger than that of the magnetic detection element and a small amount of residual magnetism, so that when permanent magnet faces the front of the magnetic detection element, the magnetic induction piece performs bypass induction of only a part of the magnetic flux of the permanent magnet to act on the magnetic detection element thereby the magnetic saturation of the magnetic induction piece is effected, and when the permanent magnet faces the position shifted from the front of the magnetic detection element, the magnetic induction piece performs bypass induction of most of the magnetic flux of the permanent magnet to act on the magnetic detection element. In this constitution, when the permanent magnet is at the position corresponding to the front of the magnetic detection element, the magnetic flux density to act on the magnetic detection element is high, and the magnetic flux induced through the magnetic induction piece becomes a relative part and most of the magnetic flux acts on the magnetic detection element. On the contrary, when the permanent magnet becomes away from the magnetic detection element and therefore the magnetic flux density to act on the magnetic detection element is gradually decreased, the ratio of the magnetic flux subjected to the bypass induction through the magnetic induction piece is relatively increased and the flux density to act on the magnetic detection element is rapidly decreased, and moreover since the magnetic induction piece has a small amount of residual magnetism there is little influence of the magnetic force to the magnetic detection element.

Consequently, according to the invention, only when the permanent magnet is displaced in the front of the magnetic detection element and there is a narrow range on both sides of the front position, the flux of high density acts on the magnetic detection element, and when the permanent magnet is slightly shifted from the center position of the magnetic detection element (since the magnetic flux to act on the magnetic detection element is rapidly decreased), the position of the piston can be detected exactly and with precise accuracy and without any erroneous operation.

BRIEF DESCRIPTION OF THE DRAWINGS

FIG. 4(2) is a graph illustrating the magnetic field strength (solid line) in the direction of line b in FIG. 4(1) and magnetic field strength (broken line) irrespective of direction.

DESCRIPTION OF PREFERRED EMBODIMENT

An embodiment of the invention applied to the detection of a piston position of an air cylinder will now be described referring to FIGS. 1 through 3.

Figure 1:
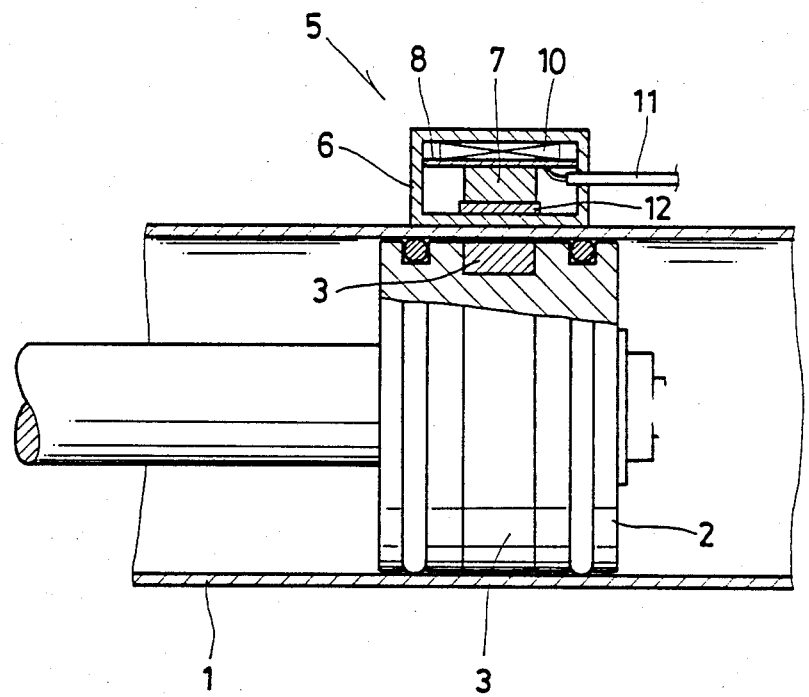
FIG. 1 is a sectional view of a position detector as an embodiment of the invention where a permanent magnet faces a magnetic detection element.
Figure 2:
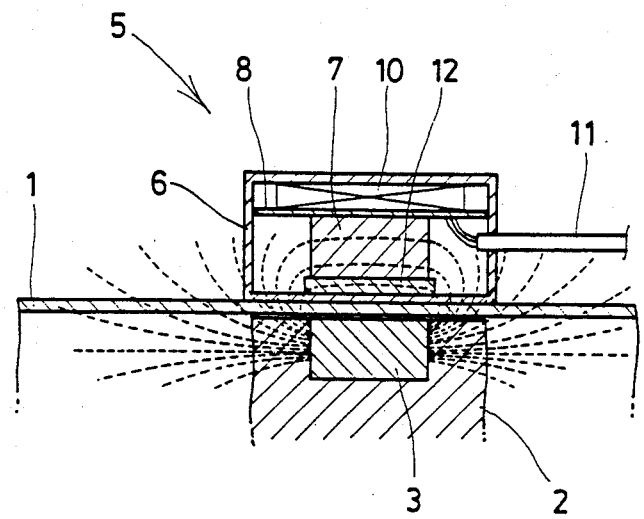
FIG. 2 is a sectional view illustrating distribution of the magnetic line of force in the state of FIG. 1.

In FIG. 1, the cylinder 1, is made of a non-magnetic material such as aluminum, non-magnetic stainless steel or the like, and a piston 2 is fitted in the cylinder 1 closely and slidably. A ring-shaped permanent magnet 3 with rectangular cross-section is fitted in a groove formed on the outer circumference of the piston 2, and has magnetic poles of opposite polarities formed on both lateral end surfaces in the figure. A sensor body 5 is mounted on the outer surface of the cylinder 1 by a fixture (not shown), for which the lower surface of the case 6 is made of a non-magnetic material that is attached to the outer surface of the cylinder 1 so that the mounting position of the sensor body 5 is movable and adjustable. Within the case 6 of the sensor body 5, a magnetic detection element 7 composed of a magnetoresistive element with resistance value increasing corresponding to the strength of the magnetic field along the moving direction of the piston 2, a Hall element or a reed switch and the like is mounted on a substrate 8 in the case 6, and a prescribed gap is taken between the magnetic detection element 7 and the inside bottom surface of the case 6. A control circuit 10 of the magnetic detection element 7 is assembled on an upper surface of the substrate 8, and a lead wire 11 connected to the control circuit 10 is drawn out of the case 6. A magnetic induction piece 12 in sheet form made of a magnetic material with a small amount of residual magnetism is interposed is the gap between the lower surface of the magnetic detection element 7 and the inside bottom surface of the case 6.

The magnetic induction piece 12 has a plane area being equal to or larger than that of the magnetic detection element 7, for example, 5×5 mm to 20×20mm; and extremely thin, for example, 20μ to 100μ. Consequently, the magnetic induction piece 12 is saturated by the magnetic flux as small as 10 gauss. In respect of its material, amorphous alloy of iron . nickel series or iron.-nickel.cobalt series is most suitable because of its high permeability, small residual magnetism, particularly in that the residual magnetism is small compared with the magnetic field varying at a high frequency. The amorphous alloy may be used also in powders applied onto a sheet, a number of thin wires arranged, or a net knitted by thin wires.

Next, the function of the embodiment will described. As shown in FIG. 2, when the permanent magnet 3 faces to the front of the magnetic detection element 7, since the magnetic flux is of a high density of about 100 gauss acts on the magnetic detection element 7, the magnetic induction piece 12 is magnetically saturated only by the bypass induction of a part of the magnetic flux, and most of the magnetic flux acts on the magnetic detection element 7.

Figure 3:
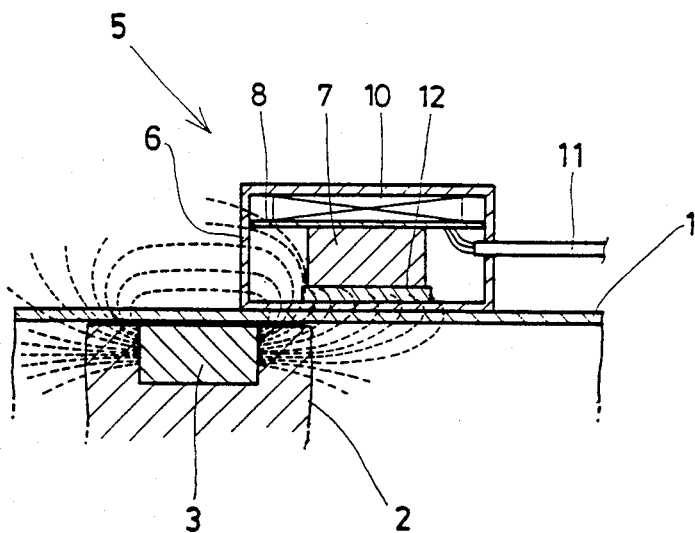
FIG. 3 is a sectional view illustrating distribution of the magnetic line of force where the permanent magnet is slightly shifted from the magnetic detection element, a magnetic induction piece 12, in each figure, being exaggerated in thickness.
Figure 4:
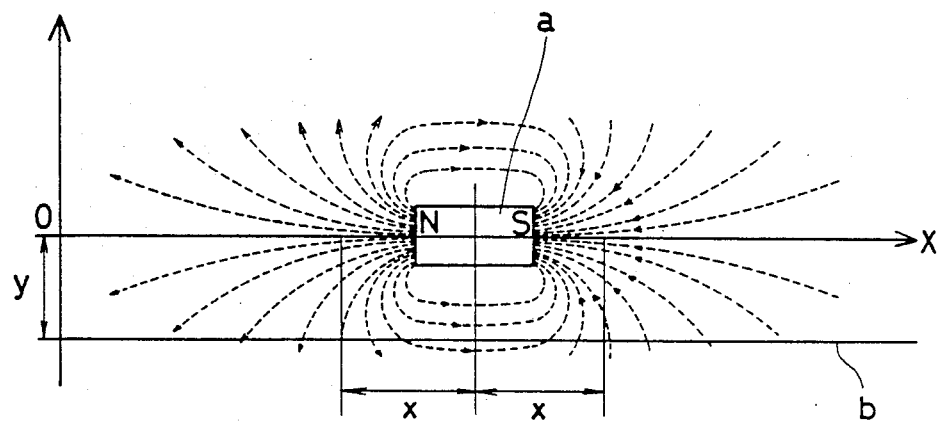
FIG. 4(1) is a distribution diagram of magnetic line of force formed by the permanent magnet.
Figure 4:
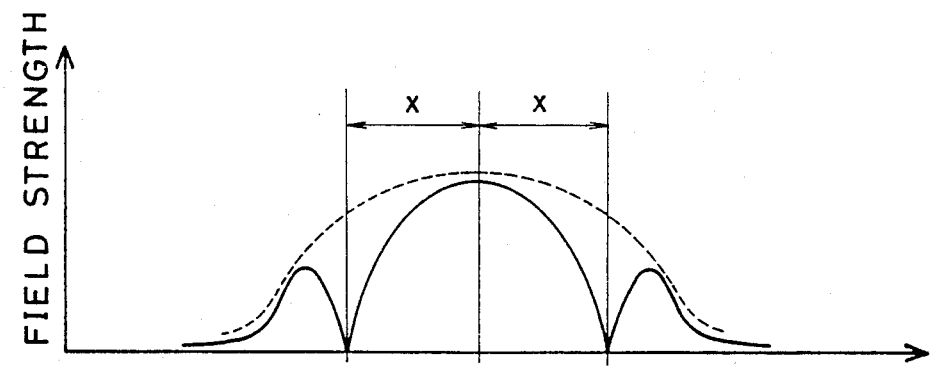

On the contrary, as shown in FIG. 3, as the piston 2 is moved and the permanent magnet 3 is shifted from the front position of the magnetic detection element 7, the flux density to act on the magnetic detection element 7 is gradually decreased and the magnetic induction piece 12 is not magnetically saturated, thereby the ratio of the bypass induction of the flux through the magnetic induction piece 12 is rapidly increased and the flux density acting on the magnetic detection element 7 is relatively rapidly decreased. Moreover, since the magnetic induction piece 12 has a small amount of residual magnetism, there is little influence to the magnetic detection element 7 by the magnetic force of the magnetic induction piece 12. Consequently, by suitably setting the sensitivity of the magnetic detection element 7, the magnetic detection element 7 can generate detection signals only when the permanent magnet 3 is in the front of the magnetic detection element 7 and with a narrow range on both sides thereof. In this constitution, the position of the piston 2 can be detected with precise accuracy and without any erroneous action.

When the amorphous alloy of iron.nickel series or iron.nickel.cobalt series is used in the magnetic induction piece 12, since the residual magnetism is small to the magnetic field varying at high frequency as already described, the correct detection can be performed even if the piston 2 is moved at a high speed.

What is claimed is:

1. A piston position detector for a fluid pressure cylinder wherein a piston is fitted closely and slidably in a cylinder made of a non-magnetic material comprising:

a permanent magnet mounted on the piston;

a magnetic detection element mounted at a required position on the outer circumference of the cylinder for responding to a magnetic field formed by the permanent magnet and for generating electric detection signals; and a magnetic induction piece in sheet form interposed between the magnetic detection element and the cylinder, said magnetic induction piece having a plane area substantially larger than that of the magnetic detection element and is made of an amorphous alloy with a small amount of residual magnetism, whereby when the permanent magnet faces the front of the magnetic detection element, the magnetic induction piece is magnetically saturated by performing bypass induction of only a part of the magnetic flux of the permanent magnet to act on the magnetic detection element, and as the permanent magnet is substantially shifted from the front of the magnetic detection element, the ratio of the magnetic flux performed bypass induction through the magnetic induction piece to the magnetic flux of the permanent magnet to act on the magnetic detection element is increased.

2. A piston position detector for a fluid pressure cylinder as set forth in claim 1, wherein said magnetic induction piece is made of an amorphous alloy of iron.-nickel series or iron.nickel.cobalt series.

* * * * *